United States Patent [19]
Mori

[11] Patent Number: 5,296,971
[45] Date of Patent: Mar. 22, 1994

[54] OBJECTIVE LENS SYSTEM FOR ENDOSCOPES

[75] Inventor: Takao Mori, Shibuya, Japan

[73] Assignee: Olympus Optical Co., Ltd., Tokyo, Japan

[21] Appl. No.: 845,158

[22] Filed: Mar. 3, 1992

[30] Foreign Application Priority Data

Mar. 4, 1991 [JP] Japan ................................. 3-37275

[51] Int. Cl.$^5$ ............................................. G02B 3/02
[52] U.S. Cl. .................................. 359/716; 359/740; 359/782
[58] Field of Search ............. 359/660, 661, 708, 715, 359/716, 740, 775, 784, 788, 790, 774, 781–783

[56] References Cited

U.S. PATENT DOCUMENTS

| | | | |
|---|---|---|---|
| 4,059,344 | 11/1977 | Yamasita | 359/783 |
| 4,674,844 | 6/1987 | Nishioka et al. | 359/782 |
| 4,806,001 | 2/1989 | Okabe et al. | 359/708 |
| 4,867,546 | 9/1989 | Nishioka et al. | 359/714 |
| 4,984,878 | 1/1991 | Miyano | 359/783 |
| 5,175,650 | 12/1992 | Takayama et al. | 359/663 |

*Primary Examiner*—Bruce Y. Arnold
*Assistant Examiner*—James Phan
*Attorney, Agent, or Firm*—Cushman, Darby & Cushman

[57] ABSTRACT

The present invention relates to a retrofocus type of objective lens system for endoscopes which has a wide field angle, a short total length and a short outer diameter, comprises a limited number of lenses and is well corrected for various aberrations. This objective lens for endoscopes comprises a first lens component $L_1$ having a negative refractive power, a second lens component $L_2$ having a positive refractive power, an aperture stop S positioned just in the rear of the second lens component $L_2$ and a third lens component that is a cemented lens obtained by cementing together a positive lens and a negative lens.

11 Claims, 7 Drawing Sheets

OBJECTIVE LENS SYSTEM FOR ENDOSCOPES

BACKGROUND OF THE INVENTION

The present invention relates generally to an objective lens system for endoscopes and more particularly to an objective lens system for endoscopes which has a wide field angle, is made compact because of having a short total length and a short outer diameter, and is limited in the number of lenses used.

Among objectives lenses for endoscopes known so far in the art, there is a retrofocus type of lens such as that shown in FIG. 1 (see Japanese Provisional Patent Publication No. Sho. 63-281112 for example). This retrofocus type of objective lens comprises negative and positive lens components on the object and image sides, respectively, between which a stop S is located. This objective lens enables the negative lens component located in front of the stop S to deflect a principal ray P so strongly that a wide field angle can be achieved, and further allows the positive lens component in the rear of the stop S to make the principal ray P incident on the image plane parallel with the optical axis, causing the light flux to strike vertically on an image guide G.

In recent years, however, video scopes using various solid-state image sensors instead of image guides have often been used as well. When a video scope is used, however, a picture on the monitor screen lacks precision in terms of the colors reconstructed, because the built-in solid-state image sensor is sensitive to infrared light other than visual light. For this reason, it is required to use a filter for cutting off infrared light (an infrared cutoff filter). Also, when laser light lying in the near to far infrared range is used with a video scope for medical purposes, a solid-state image sensor such as a CCD is saturated with this laser light, giving rise to a smear or blooming, which otherwise makes it difficult to view the internal part to be examined. It is thus required to locate within the optical system a filter for cutting off light having a wavelength corresponding to that of the laser light used (e.g., an YAG cutoff filter).

Referring here to an optical system of such a type as set forth in Japanese Provisional Patent Publication No. Hei. 1-217410 (see FIG. 2), however, the insertion of such filters between the first and second lens components and the second and third lens components renders it impossible for them to show their own properties, because the angle of inclination of off-axial marginal rays with respect to the optical axis is very large. In the case of an absorption type of filter, on the one hand, a large angle of incidence of the rays is responsible for a color variation on the screen, because there is a difference in the optical paths due to a difference in the image height. In the case of an interference type of infrared cutoff filter, on the other hand, an increase in the angle of incidence of the rays induces a sharp change in the spectral transmittance characteristic and a rapid increase in the infrared transmittance, making it impossible to cut off rays lying in the infrared range sufficiently.

Referring again to the optical system of the type as disclosed in Japanese Provisional Patent Publication No. Sho. 63-281112, the space between the 3rd lens component and the image plane is narrow; that is, some difficulty is encountered in the insertion of a filter in it. Enlarging the space between the 3rd lens component and the image plane to allow for the insertion of a filter is unsuited for an endoscopic objective lens, because the outer diameter of the 3rd lens component becomes too large.

In such a conventional objective lens for endoscopes as shown in FIGS. 1 or 2, the chromatic aberration of magnification is compensated for only by the cemented lens of the rear unit; that is, the chromatic aberration of magnification caused by the negative lens of the front unit cannot be well made up for. In order to lower the ray height in the 1st lens component for the purpose of achieving a wide field angle and reducing the outer diameter of the 1st lens component, it is also required to increase the negative power of the 1st lens component. With the conventional lens system shown in FIGS. 1 or 2, however, the asymmetry of a large coma caused by increasing the power of the 1st lens component cannot be compensated for by the 2nd, ... lens components. In addition, when the lens refractive index of the 1st lens component are increased with a view to increasing the negative power of the 1st lens component, the dispersion of that lens becomes too high to make up for a large chromatic aberration taking place through the 1st lens component by the 2nd, ... lens components. For this reason, when it is intended to impart a wide field angle to the conventional retrofocus type of objective lens for endoscopes, it is subject to a problem that the outer diameter of the first lens component becomes large.

SUMMARY OF THE INVENTION

In view of such situations, an object of this invention is to solve the problems associated with such conventional objective lenses for endoscopes as mentioned above by the provision of a retrofocus type of objective optical system, more specifically, an objective lens system for endoscopes which has a wider field angle, a shorter total length and a smaller outer diameter, is more reduced in the number of lenses used, and is better corrected for aberrations.

According to this invention, this object is achieved by the provision of an objective lens system for endoscopes comprising, in order from the object side, a first lens component having a negative refractive power, a second lens component having a positive refractive power, an aperture stop located just in the rear of the second lens component and a third lens component that is a cemented lens obtained by cementing together a positive lens and a negative lens.

According to this invention, it is desired that the composite focal length of the 1st and 2nd lens components located in front of the aperture stop be positive and meet the following conditions (1) and (2):

$$0.1f < -|f_1| + |f_2| < 3f, \tag{1}$$

and $$0.1 < |f_1|/|f_2| < 1.5. \tag{2}$$

Here f is the focal length of the total system and $f_1$ and $f_2$ represent the focal lengths of the 1st and 2nd lens components, respectively.

It is also desired that the following condition (3) be satisfied:

$$f < f_3 < 6f. \tag{3}$$

Here $f_3$ is the focal length of the 3rd lens component. In this case, it is further desired that the following condition (4) be satisfied:

$$f_3/H > 1.2. \tag{4}$$

Here H is the maximum image height.

It is further desired that the above objective lens system for endoscopes contain at least one aspherical lens. It is then preferred that at least one aspherical surface which becomes increased in the refractive action in the negative direction as it goes off the center of the lens be applied to a lens surface positioned in front of the aperture stop, or an aspherical surface which becomes decreased in the positive refractive action as it goes off the center of the lens be applied to the image-side convex surface of the cemented lens of the third lens component positioned in the rear of the aperture stop.

In what follows, the reason why the above construction is used and the action thereof will be explained.

As mentioned above, the objective lens system for endoscopes according to this invention is a lens system which comprises, in order from the object side, a first lens component having a negative refractive power, a second lens component having a positive refractive power, an aperture stop located just in the rear of the second lens component and a third lens component that is a cemented lens formed by cementing together a positive lens and a negative lens.

With the objective lens system of this invention, the coma can be well compensated for in front of the aperture stop by locating the second lens component having a positive power between the first lens component having a negative refractive power and the aperture stop, whereby a (+) coma that is opposite in direction to a (−) coma caused by the concave surface of the first lens component is generated by the rear surface of the second lens component. In regard to the signs "−" and "+" affixed to the term "coma", it is understood that the former sign refers to the direction along which an image is formed on the Gaussian image plane inwardly of the principal ray, and the latter to the opposite direction.

In the rear of the aperture stop, the (+) coma is also generated by the cemented surface of the third lens component, whereby a trace of the (−) coma is compensated for by the front unit located before the aperture stop.

As mentioned above, the lens system of this invention enables the coma to be compensated for both in front of and in the rear of the aperture stop, so that the quantity of deflection of the coma and, hence, the quantity of aberrations can be reduced. Also, the lens system of this invention enables the chromatic aberration of magnification to be well corrected even by the second lens component located between the aperture stop and the first lens component.

Thus, the lens system of this invention, wherein the aberrations are substantially corrected by the front unit located before the aperture stop, makes it possible to achieve satisfactory aberration correction with a reduced number of lenses, and so is usefully applicable to an adapter system which is designed to have a variable field angle by separating an objective optical system into two parts at a stop and replacing the front part with another one.

In order to allow the lens system to have a wide field angle, the heights of rays through the first lens component to be lowered and the outer diameter of the first lens component to be reduced, the power of the first lens component must be increased. According to this invention wherein the coma or chromatic aberration caused by the first lens component can be compensated for by the second lens component, as already mentioned, various aberrations can be corrected well enough, even when the power of the first lens component is much increased. Hence, the outer diameter of the first lens component can be reduced, enabling the lens system to have a wide field angle.

In order to reduce the distance from the aperture stop to the image-forming position while the outer diameter of the first lens component remains limited at a wide field angle, it is further desired that the composite focal length of the first and second lens components located in front of the aperture stop be positive.

In order to permit the total length to be reduced and the aberrations to be well corrected, the lens system of this invention should preferably satisfy the following conditions:

$$0.1f < -|f_1| + |f_2| < 3f, \ldots \tag{1}$$

and $$0.1 < |f_1|/|f_2| < 1.5. \ldots \tag{2}$$

Here f is the focal length of the total system and $f_1$ and $f_2$ represent the focal lengths of the 1st and 2nd lens components, respectively.

For convenience of illustration, the objective lens system of this invention is taken as being approximated to a thin lens arrangement, as shown in FIG. 3 wherein $L_1$, $L_2$ and $L_3$ stand for the first, second and third lens components, respectively, and S denotes an aperture stop.

Exceeding the upper limit of the above condition (1) is unpreferred because the length of the front unit positioned before stop S becomes too long. Falling short of the lower limit of the condition (1) may make the total length of the lens system short, but renders it impossible to reduce the aberrations caused by the front unit before the stop, because the powers of the first and second lens components $L_1$ and $L_2$ become too strong; the aberrations caused by the first and second lens components $L_1$ and $L_2$ become too strong.

When "$-|f_1| + |f_2|$" meets the above condition (1) but the power of the second lens component $L_2$ is too strong relative to that of the first lens component $L_1$, a (−) spherical aberration caused by the second lens component $L_2$ cannot be corrected by the rear unit at all, because it is too large as compared with a (+) spherical aberration caused by the first lens component $L_1$. On the contrary, when the power of the first lens component $L_1$ becomes too strong as compared with that of the second lens component $L_2$, the (−) coma caused by the first lens component $L_1$ cannot be well corrected by the second lens component $L_2$. In order to achieve satisfactory aberrational correction, therefore, it is required that the power ratio of the first and second lens components $L_1$ and $L_2$ lie within a certain range. It is this range which is defined by Condition (2). Below the lower limit of this condition the coma gets too bad for correction, whereas above the upper limit the spherical aberration gets too bad for correction.

Now let us consider the rear lens unit located behind the aperture stop. In order to shorten the total length of the lens system and correct the aberrations well, the rear lens unit or the third lens component $L_3$ should preferably have a focal length $f_3$ conforming to the condition (3):

$$f < f_3 < 6f. \tag{3}$$

The focal length $f_3$ falling short of the lower limit of Condition (3) makes the distance from the aperture stop to the 3rd lens component $L_3$ so short that the total length of the lens system can be shortened, but this is unpreferred for a lens system for video scopes required to have a filter such as an infrared cutoff filter, YAG cutoff filter or crystalline filter incorporated in it. In addition, the angle of inclination—shown by $\theta'$ in FIG. 3—of an off-axial principal ray through the aperture stop is large enough so as to increase the outer diameter of the front lens unit located before the stop. In this connection, it is noted that if a very strong power is imparted to the second lens component $L_2$, it may then be possible to avoid an increase in the outer diameter of the first lens component $L_1$—because the second lens component $L_2$ has been positioned before the stop. However, the increase in the power of the second lens component $L_2$ gives rise to an increased spherical aberration, rendering its correction difficult.

The focal length $f_3$ exceeding the upper limit of Condition (3) is again unpreferred, because the distance from the aperture stop to the image-forming plane is increased, resulting in an increase in the total length of the lens system. If it is intended to shorten the total length of the lens system in this state, the power of each of the lenses located in front of the aperture stop will then be increased so as to make the correction of spherical aberration, astigmatism and coma difficult.

It is here noted that an interference type of infrared cutoff filter cannot cut off light lying in the infrared range at a large angle of incidence of rays, because its infrared transmittance rises sharply. Referring on the other hand to an absorption type of filter, the large angle of incidence of rays is again responsible for a color variation on a screen, because there is a difference in the optical paths due to a difference in the image heights. For the filters, whether the interference or absorption type, it is required that the angles of rays incident thereon be reduced. In view of practicality, such angles of incidence lie preferably at about 40° or less. In other words, if a telecentric type of optical system is applied to a video scope with a built-in infrared or YAG cutoff filter, for instance, an arrangement wherein this filter is positioned just in the rear of an aperture stop should preferably conform to the following conditional formula (4):

$$f_3/H > 1.2. \tag{4}$$

Here $H$ is the maximum image height.

The above conditional formula (4) holds for a non-telecentric system as well, because the angle of inclination of an off-axial principal ray at the location of an aperture stop is smaller in the telecentric system that in the non-telecentric system. By conforming to this formula, therefore, it is possible to achieve a filter arrangement which undergoes no color variation and can well cut off light lying in the infrared range. In order to illustrate the above reason, the rear lens unit positioned behind the aperture stop of the lens system is taken as being approximated to a thin lens system, as shown in FIG. 4. This figure, wherein $L_3$ stands for a third lens component and S denotes an aperture stop, represents the reverse tracing of rays from the image-plane side toward the object-side plane. Now let $d_1$, $d_0$, $u_0$ and $u_1$ denote the space between the third lens component and the aperture stop, the angle of inclination of an off-axial principal ray that gives rise to the image height H and passes through the aperture stop and the angle of inclination of that off-axial principal ray with respect to the optical axis when it exits from the third lens component toward the image plane, respectively. In addition, now let $\phi$ stand for the power of $L_3$ and suppose that $L_3$ is positioned such that $d_0 = -d_1$ so as to simplify the calculation involved. Then, $u_1$ and H are expressed by the following equations (a) and (b):

$$u_1 = u_0(1 - \phi d_0), \tag{a}$$

and $$H = u_0 d_0 - u_1 d_0. \tag{d}$$

While the third lens component, the aperture stop and the image-forming position are kept unvaried in terms of position but the third lens component has a varied focal length, now compare the magnitude of $u_0$ in the telecentric system (designated by $u_0'$) and that of $u_0$ in the non-telecentric system (designated by $u_0''$).

First, suppose that $f_3'$ denotes the focal length of the third lens component in the telecentric system. Then, $d_0 = -d_1 = f_3'$ holds, as can be seen from FIG. 5, and $u_0'$ and $u_0''$ are represented by the following equations (c) and (d):

$$u_1' = 0, \tag{c}$$

and $$u_0' = H/f_3'. \tag{d}$$

Second, suppose that when the focal length of the third lens component is expressed by $f_3'' = kf_3'$ wherein $k > 0$ in the non-telecentric system, $u_0$ and $u_1$ become $u_0''$ and $u_1''$, respectively. Then, we obtain the following equation (3):

$$u_0'' = k/(2k-1) \times u_0' \text{ wherein } k > \tfrac{1}{2}. \tag{e}$$

When $\tfrac{1}{2} < k < 1$ in the above equation (e) or, in other words, when the focal length $f_3$ of the third lens component $L_3$ in such a non-telecentric optical system, as shown in FIG. 6, is shorter than the focal length $f_3''$ of the third lens component the angle of inclination of the off-axial principal ray at the location of the aperture stop is larger than is the case with the telecentric system. This is unpreferred, because not only the height of the off-axial marginal ray incident on the third lens component $L_3$ but the outer diameter of the lens of the third lens component as well is much increased. On the contrary, when $k > 1$ in Equation (e) or, in other words, when the focal length $f_3'$ of the third lens component $L_3$ in the telecentric optical system is shorter than the focal length $f_3''$ of the third lens component, the angle of inclination of the off-axial principal ray at the aperture stop is smaller than is the case of the telecentric system. This enables the height of the off-axial marginal ray incident on the third lens component to be lowered and so the outer diameter of the lens of the third lens component to be reduced.

As can be understood from what has been described above, it is preferred for the optical system used for endoscopes that k be equal to or larger than 1 in Equation (e). If k>1, then the conditional formula (4) also holds for the non-telecentric system, because the angle of inclination of the off-axial principal ray at the location of the aperture stop is smaller than is the case with the telecentric system.

Still other objects and advantages of the invention will in part be obvious and will in part be apparent from the specification.

The invention accordingly comprises the features of construction, combinations of elements, and arrangement of parts which will be exemplified in the construction herein-after set forth, and the scope of the invention will be indicated in the claims.

DESCRIPTION OF THE PREFERRED EMBODIMENTS

Figure 1:
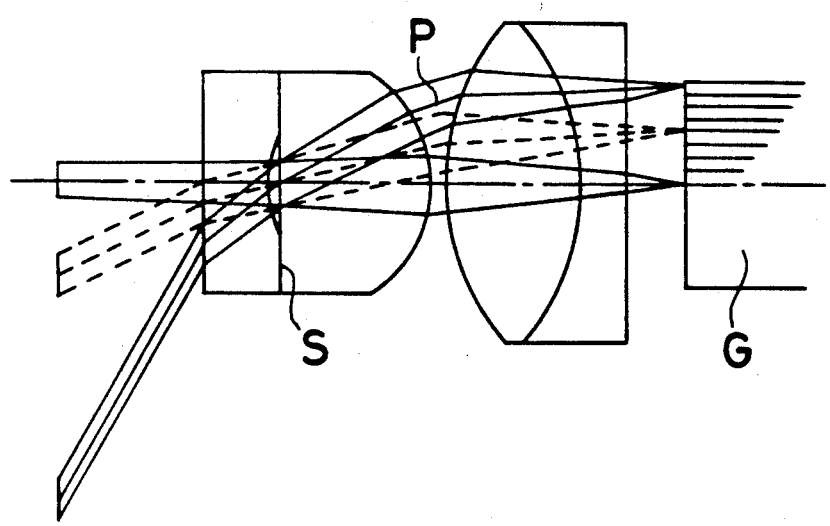
FIGS. 1 and 2 represent conventional lenses in section.
Figure 2:
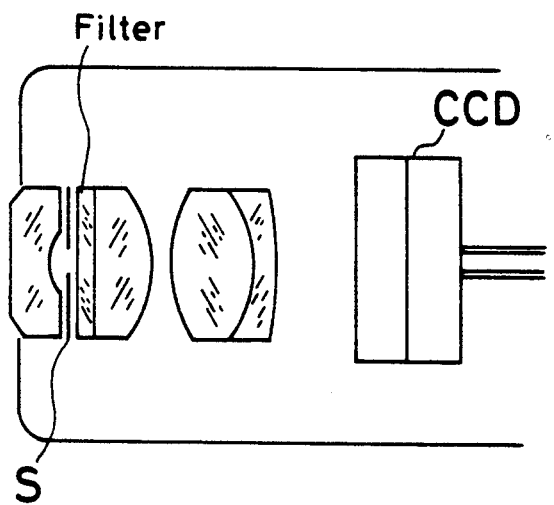
Figure 3:
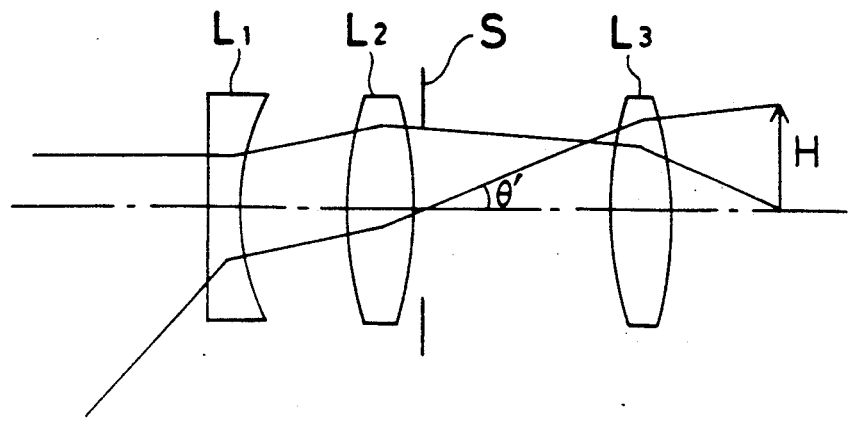
FIG. 3 represents an arrangement of the lens system of this invention which is shown to be approximated to a thin lens system.
Figure 4:
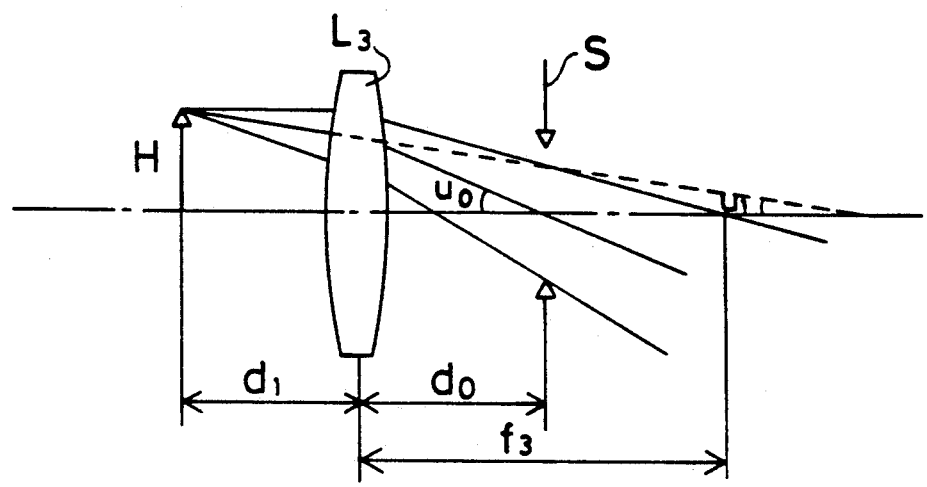
FIG. 4 illustrates the reverse tracing of the rear unit of this invention positioned behind the aperture stop.
Figure 5:
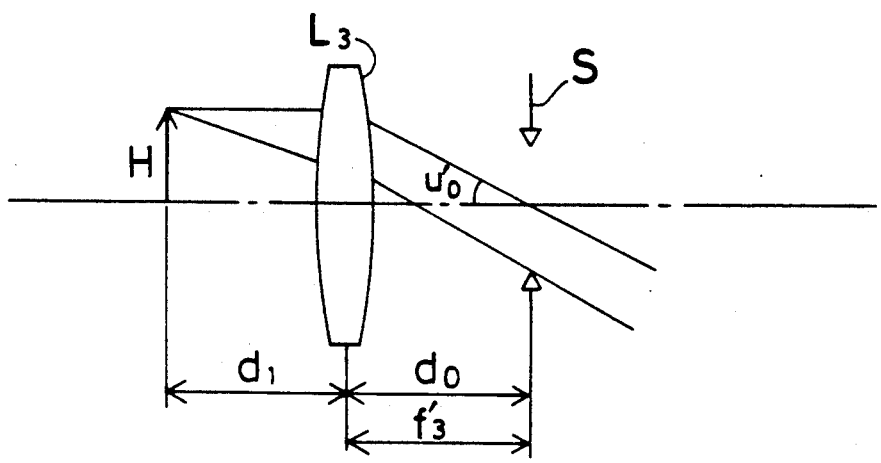
FIG. 5 represents the lens arrangement of FIG. 3 in a telecentric system.
Figure 6:
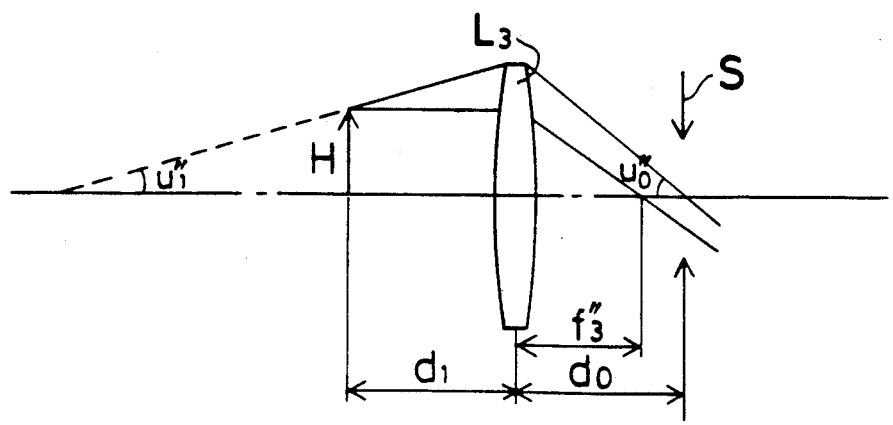
FIG. 6 represents the lens arrangement of FIG. 3 in a non-telecentric system.

Examples 1-12 of the objective lens for endoscopes according to this invention will now be explained. While the lens data of each of Examples 1-12 will be given later, the lenses of Examples 1 and 2 are shown in section in FIGS. 7 and 8. It is noted, however, that the sectional views of lenses of Examples 3-12 are not shown because of their similarities to FIG. 7. Aberration diagrams showing the spherical aberrations, astigmatisms, distortions and comae of Examples 1-12 are shown in FIGS. 9-20.

In the ensuing data, symbols referred to hereinafter but not hereinbefore stand for: $f$ . . . the focal length of the total system, $F_{NO}$ . . . the F-number, IH . . . the image height, $2\omega$ . . . the field angle, $f_{12}$ . . . the composite focal length of the 1st and 2nd lens component, $r_1$, $r_2$, . . . the radii of curvature of the lens surfaces, $d_1$, $d_2$, . . . the spaces between the lens surfaces, $n_{d1}$, $n_{d2}$, . . . the d-line refractive indices of the lenses, and $\nu_{d1}$, $\nu_{d2}$, . . . the Abbe's numbers of the lenses. If x and y denote the optical direction and the direction normal thereto, respectively, the aspherical configurations used are then represented by the following formula:

$$x = (y^2/r)/[1 + \{1 - P(y^2/r^2)\}^{\frac{1}{2}}] + A_4 Y^4 + A_6 Y^6 + A_8 Y^8.$$

Here r is the paraxial radius of curvature, P is the conical coefficient and $A_4$, $A_6$ or $A_8$ is the aspherical coefficient.

Example 1

$f = 1$
$F_{NO} = 4.205$
$I\,H = 0.8948$
$2\omega = 114.6°$

| | | |
|---|---|---|
| $r_1 = \infty$ | $d_1 = 0.3304$ | $n_{d1} = 1.88300\ \nu_{d1} = 40.78$ |
| $r_2 = 0.6783$ | $d_2 = 0.6000$ | |
| $r_3 = 3.5348$ | $d_3 = 1.3652$ | $n_{d2} = 1.72916\ \nu_{d2} = 54.68$ |
| $r_4 = -1.3600$ | $d_4 = 0.0870$ | |
| $r_5 = \infty$ (stop) | $d_5 = 0.3478$ | $n_{d3} = 1.52287\ \nu_{d3} = 59.89$ |
| $r_6 = \infty$ | $d_6 = 0.0261$ | |
| $r_7 = \infty$ | $d_7 = 0.5391$ | $n_{d4} = 1.52000\ \nu_{d4} = 74.00$ |
| $r_8 = \infty$ | $d_8 = 0.1391$ | |
| $r_9 = 2.9104$ | $d_9 = 1.2609$ | $n_{d5} = 1.69680\ \nu d_5 = 55.52$ |
| $r_{10} = -0.9191$ | $d_{10} = 0.2609$ | $n_{d6} = 1.84666\ \nu_{d6} = 23.78$ |
| $r_{11} = -3.8252$ | $d_{11} = 0.0870$ | |
| $r_{12} = \infty$ | $d_{12} = 0.3478$ | $n_{d7} = 1.52287\ \nu_{d7} = 59.89$ |
| $r_{13} = \infty$ | $d_{13} = 0.5739$ | |
| $r_{14} = \infty$ | $d_{14} = 0.8996$ | $n_{d8} = 1.51633\ \nu_{d8} = 64.15$ |
| $r_{15} = \infty$ | | |

$-|f_1| + |f_2| = 0.758$
$|f_1|/|f_2| = 0.503$
$f_{12} = 2.403$
$f_3 = 3.521$
$f_3/H = 3.935$

Example 2

$f = 1$
$F_{NO} = 6.546$
$I\,H = 0.9123$
$2\omega = 112.5°$

| | | |
|---|---|---|
| $r_1 = \infty$ | $d_1 = 0.3557$ | $n_{d1} = 1.88330\ \nu_{d1} = 40.78$ |
| $r_2 = 0.7148$ | $d_2 = 0.8892$ | |
| $r_3 = 1.6750$ | $d_3 = 0.7592$ | $n_{d2} = 1.68893\ \nu_{d2} = 31.08$ |
| $r_4 = -1.6750$ | $d_4 = 0.0611$ | |
| $r_5 = \infty$ (stop) | $d_5 = 0.2371$ | $n_{d3} = 1.52287\ \nu_{d3} = 59.89$ |
| $r_6 = \infty$ | $d_6 = 0.0178$ | |
| $r_7 = \infty$ | $d_7 = 0.3675$ | $n_{d4} = 1.52000\ \nu_{d4} = 74.00$ |
| $r_8 = \infty$ | $d_8 = 0.0178$ | |
| $r_9 = \infty$ | $d_9 = 0.5928$ | $n_{d5} = 1.69680\ \nu_{d5} = 55.52$ |
| $r_{10} = -0.5928$ | $d_{10} = 0.2371$ | $n_{d6} = 1.84666\ \nu_{d6} = 23.78$ |
| $r_{11} = -1.6857$ | $d_{11} = 0.0593$ | |

-continued

| | | |
|---|---|---|
| $r_{12} = \infty$ | $d_{12} = 0.2371$ | $n_{d7} = 1.52287$ $\nu_{d7} = 59.89$ |
| $r_{13} = \infty$ | $d_{13} = 0.8628$ | |
| $r_{14} = \infty$ | $d_{14} = 1.2448$ | $n_{d8} = 1.51633$ $\nu_{d8} = 64.15$ |
| $r_{15} = \infty$ | | |

$-|f_1| + |f_2| = 0.529$
$|f_1|/|f_2| = 0.604$
$f_{12} = 1.787$
$f_3 = 3.171$
$f_3/H = 3.476$

Example 3

$f = 1$
$F_{NO} = 3.627$
$IH = 0.9706$
$2\omega = 133°$

| | | |
|---|---|---|
| $r_1 = \infty$ | $d_1 = 0.3595$ | $n_{d1} = 1.88300$ $\nu_{d1} = 40.78$ |
| $r_2 = 0.7364$ | $d_2 = 0.6403$ | |
| $r_3 = 2.7059$ | $d_3 = 1.4187$ | $n_{d2} = 1.72916$ $\nu_{d2} = 54.68$ |
| $r_4 = 1.5155$ | $d_4 = 0.0946$ | |
| $r_5 = \infty$(stop) | $d_5 = 0.3784$ | $n_{d3} = 1.52287$ $\nu_{d3} = 59.89$ |
| $r_6 = \infty$ | $d_6 = 0.0284$ | |
| $r_7 = \infty$ | $d_7 = 0.5866$ | $n_{d4} = 1.52000$ $\nu_{d4} = 74.00$ |
| $r_8 = \infty$ | $d_8 = 0.0946$ | |
| $r_9 = 2.2462$ | $d_9 = 0.9942$ | $n_{d5} = 1.69680$ $\nu_{d5} = 55.52$ |
| $r_{10} = -0.9387$ | $d_{10} = 0.2490$ | $n_{d6} = 1.84666$ $\nu_{d6} = 23.78$ |
| $r_{11} = -5.8320$ | $d_{11} = 0.0946$ | |
| $r_{12} = \infty$ | $d_{12} = 0.3784$ | $n_{d7} = 1.52287$ $\nu_{d7} = 59.89$ |
| $r_{13} = \infty$ | $d_{13} = 0.4060$ | |
| $r_{14} = \infty$ | $d_{14} = 0.9461$ | $n_{d8} = 1.51633$ $\nu_{d8} = 64.15$ |
| $r_{15} = \infty$ | | |

$-|f_1| + |f_2| = 0.719$
$|f_1|/|f_2| = 0.537$
$f_{12} = 2.421$
$f_3 = 3.392$
$f_3/H = 3.495$

Example 4

$f = 1$
$F_{NO} = 3.589$
$IH = 1.0147$
$2\omega = 147°$

| | | |
|---|---|---|
| $r_1 = \infty$ | $d_1 = 0.3759$ | $n_{d1} = 1.88300$ $\nu_{d1} = 40.78$ |
| $r_2 = 0.7565$ | $d_2 = 0.6963$ | |
| $r_3 = 3.1861$ | $d_3 = 1.4646$ | $n_{d2} = 1.72916$ $\nu_{d2} = 54.68$ |
| $r_4 = -1.5518$ | $d_4 = 0.0989$ | |
| $r_5 = \infty$(stop) | $d_5 = 0.3956$ | $n_{d3} = 1.52287$ $\nu_{d3} = 59.89$ |
| $r_6 = \infty$ | $d_6 = 0.0297$ | |
| $r_7 = \infty$ | $d_7 = 0.6133$ | $n_{d4} = 1.52000$ $\nu_{d4} = 74.00$ |
| $r_8 = \infty$ | $d_8 = 0.0989$ | |
| $r_9 = 2.3827$ | $d_9 = 1.0394$ | $n_{d5} = 1.69680$ $\nu_{d5} = 55.52$ |
| $r_{10} = -0.9814$ | $d_{10} = 0.2603$ | $n_{d6} = 1.84666$ $\nu_{d6} = 23.78$ |
| $r_{11} = -5.3950$ | $d_{11} = 0.0989$ | |
| $r_{12} = \infty$ | $d_{12} = 0.3956$ | $n_{d7} = 1.52287$ $\nu_{d7} = 59.89$ |
| $r_{13} = \infty$ | $d_{13} = 0.4303$ | |
| $r_{14} = \infty$ | $d_{14} = 0.9891$ | $n_{d8} = 1.51633$ $\nu_{d8} = 64.15$ |
| $r_{15} = \infty$ | | |

$-|f_1| + |f_2| = 0.789$
$|f_1|/|f_2| = 0.521$
$f_{12} = 2.507$
$f_3 = 3.422$
$f_3/H = 3.372$

Example 5

$f = 1$
$F_{NO} = 3.572$
$IH = 1.0511$
$2\omega = 166°$

| | | |
|---|---|---|
| $r_1 = \infty$ | $d_1 = 0.3893$ | $n_{d1} = 1.88300$ $\nu_{d1} = 40.78$ |
| $r_2 = 0.7628$ | $d_2 = 0.7370$ | |
| $r_3 = 3.6910$ | $d_3 = 1.4798$ | $n_{d2} = 1.72916$ $\nu_{d2} = 54.68$ |
| $r_4 = -1.5620$ | $d_4 = 0.1025$ | |
| $r_5 = \infty$(stop) | $d_5 = 0.4098$ | $n_{d3} = 1.52287$ $\nu_{d3} = 59.89$ |
| $r_6 = \infty$ | $d_6 = 0.0307$ | |
| $r_7 = \infty$ | $d_7 = 0.6352$ | $n_{d4} = 1.52000$ $\nu_{d4} = 74.00$ |
| $r_8 = \infty$ | $d_8 = 0.1025$ | |
| $r_9 = 2.4812$ | $d_9 = 1.0767$ | $n_{d5} = 1.69680$ $\nu_{d5} = 55.52$ |
| $r_{10} = -1.0166$ | $d_{10} = 0.2697$ | $n_{d6} = 1.84666$ $\nu_{d6} = 23.78$ |
| $r_{11} = -5.3022$ | $d_{11} = 0.1025$ | |
| $r_{12} = \infty$ | $d_{12} = 0.4098$ | $n_{d7} = 1.52287$ $\nu_{d7} = 59.89$ |
| $r_{13} = \infty$ | $d_{13} = 0.4503$ | |
| $r_{14} = \infty$ | $d_{14} = 1.0246$ | $n_{d8} = 1.51633$ $\nu_{d8} = 64.15$ |
| $r_{15} = \infty$ | | |

$-|f_1| + |f_2| = 0.844$
$|f_1|/|f_2| = 0.506$
$f_{12} = 2.566$

-continued $f_3 = 3.482$
$f_3/H = 3.313$

Example 6

$f = 1$
$F_{NO} = 3.902$
$IH = 0.8739$
$2\omega = 114°$

| | | |
|---|---|---|
| $r_1 = \infty$ | $d_1 = 0.3237$ | $n_{d1} = 1.88300$ $\nu_{d1} = 40.78$ |
| $r_2 = 0.7979$ | $d_2 = 0.7274$ | |
| $r_3 = 2.3820$ | $d_3 = 1.7041$ | $n_{d2} = 1.80440$ $\nu_{d2} = 39.58$ |
| $r_4 = -1.9175$ | $d_4 = 0.0852$ | |
| $r_5 = \infty\text{(stop)}$ | $d_5 = 0.3407$ | $n_{d3} = 1.52287$ $\nu_{d3} = 59.89$ |
| $r_6 = \infty$ | $d_6 = 0.0256$ | |
| $r_7 = \infty$ | $d_7 = 0.5281$ | $n_{d4} = 1.52000$ $\nu_{d4} = 74.00$ |
| $r_8 = \infty$ | $d_8 = 0.0848$ | |
| $r_9 = 1.6485$ | $d_9 = 0.7070$ | $n_{d5} = 1.60311$ $\nu_{d5} = 60.70$ |
| $r_{10} = -0.9674$ | $d_{10} = 0.2534$ | $n_{d6} = 1.84666$ $\nu_{d6} = 23.78$ |
| $r_{11} = -5.6583$ | $d_{11} = 0.3833$ | |
| $r_{12} = \infty$ | $d_{12} = 0.3407$ | $n_{d7} = 1.52287$ $\nu_{d7} = 59.89$ |
| $r_{13} = \infty$ | $d_{13} = 0.2165$ | |
| $r_{14} = \infty$ | $d_{14} = 0.8518$ | $n_{d8} = 1.51633$ $\nu_{d8} = 64.15$ |
| $r_{15} = \infty$ | | |

$-|f_1| + |f_2| = 0.7$
$|f_1|/|f_2| = 0.564$
$f_{12} = 2.188$
$f_3 = 3.61$
$f_3/H = 4.131$

Example 7

$f = 1$
$F_{NO} = 3.837$
$IH = 0.8806$
$2\omega = 114°$

| | | |
|---|---|---|
| $r_1 = \infty$ | $d_1 = 0.3262$ | $n_{d1} = 1.88300$ $\nu_{d1} = 40.78$ |
| $r_2 = 0.6693$ | $d_2 = 0.4464$ | |
| $r_3 = 1.9291$ | $d_3 = 1.3759$ | $n_{d2} = 1.64000$ $\nu_{d2} = 60.09$ |
| $r_4 = -1.2433$ | $d_4 = 0.0858$ | |
| $r_5 = \infty\text{(stop)}$ | $d_5 = 0.3433$ | $n_{d3} = 1.52287$ $\nu_{d3} = 59.89$ |
| $r_6 = \infty$ | $d_6 = 0.0258$ | |
| $r_7 = \infty$ | $d_7 = 0.5322$ | $n_{d4} = 1.52000$ $\nu_{d4} = 74.00$ |
| $r_8 = \infty$ | $d_8 = 0.0854$ | |
| $r_9 = 2.0799$ | $d_9 = 0.8970$ | $n_{d5} = 1.69680$ $\nu_{d5} = 55.52$ |
| $r_{10} = -0.8862$ | $d_{10} = 0.2259$ | $n_{d6} = 1.84666$ $\nu_{d6} = 23.78$ |
| $r_{11} = -5.2775$ | $d_{11} = 0.0858$ | |
| $r_{12} = \infty$ | $d_{12} = 0.3433$ | $n_{d7} = 1.52287$ $\nu_{d7} = 59.89$ |
| $r_{13} = \infty$ | $d_{13} = 0.5429$ | |
| $r_{14} = \infty$ | $d_{14} = 0.8584$ | $n_{d8} = 1.51633$ $\nu_{d8} = 64.15$ |
| $r_{15} = \infty$ | | |

$-|f_1| + |f_2| = 0.664$
$|f_1|/|f_2| = 0.533$
$f_{12} = 2.718$
$f_3 = 3.086$
$f_3/H = 3.504$

Example 8

$f = 1$
$F_{NO} = 3.471$
$IH = 0.8986$
$2\omega = 114°$

| | | |
|---|---|---|
| $r_1 = \infty$ | $d_1 = 0.3322$ | $n_{d1} = 1.88300$ $\nu_{d1} = 40.78$ |
| $r_2 = 0.6118$ | $d_2 = 0.4124$ | |
| $r_3 = 1.7056$ | $d_3 = 1.0839$ | $n_{d2} = 1.72916$ $\nu_{d2} = 54.68$ |
| $r_4 = -1.2065$ | $d_4 = 0.0874$ | |
| $r_5 = \infty\text{(stop)}$ | $d_5 = 0.3497$ | $n_{d3} = 1.52287$ $\nu_{d3} = 59.89$ |
| $r_6 = \infty$ | $d_6 = 0.0262$ | |
| $r_7 = \infty$ | $d_7 = 0.5420$ | $n_{d4} = 1.52000$ $\nu_{d4} = 74.00$ |
| $r_8 = \infty$ | $d_8 = 0.0874$ | |
| $r_9 = 1.8617$ | $d_9 = 0.7877$ | $n_{d5} = 1.61800$ $\nu_{d5} = 63.38$ |
| $r_{10} = -0.8469$ | $d_{10} = 0.1750$ | $n_{d6} = 1.84666$ $\nu_{d6} = 23.78$ |
| $r_{11} = -3.5174$ | $d_{11} = 0.0874$ | |
| $r_{12} = \infty$ | $d_{12} = 0.3497$ | $n_{d7} = 1.52287$ $\nu_{d7} = 59.89$ |
| $r_{13} = \infty$ | $d_{13} = 0.3058$ | |
| $r_{14} = \infty$ | $d_{14} = 0.8741$ | $n_{d8} = 1.51633$ $\nu_{d8} = 64.15$ |
| $r_{15} = \infty$ | | |

$-|f_1| + |f_2| = 0.457$
$|f_1|/|f_2| = 0.603$
$f_{12} = 2.036$
$f_3 = 3.279$
$f_3/H = 3.656$

Example 9

$f = 1$
$F_{NO} = 3.627$
$IH = 0.882$

-continued $2\omega = 114°$

| | | |
|---|---|---|
| $r_1 = \infty$ | $d_1 = 0.3290$ | $n_{d1} = 1.88300$ $\nu_{d1} = 40.78$ |
| $r_2 = 0.5795$ | $d_2 = 0.3629$ | |
| $r_3 = 2.8246$ | $d_3 = 1.0822$ | $n_{d2} = 1.72915$ $\nu_{d2} = 54.68$ |
| $r_4 = -1.0590$ | $d_4 = 0.0866$ | |
| $r_5 = \infty$(stop) | $d_5 = 0.3463$ | $n_{d3} = 1.52287$ $\nu_{d3} = 59.89$ |
| $r_6 = \infty$ | $d_6 = 0.0260$ | |
| $r_7 = \infty$ | $d_7 = 0.5368$ | $n_{d4} = 1.52000$ $\nu_{d4} = 74.00$ |
| $r_8 = \infty$ | $d_8 = 0.8715$ | |
| $r_9 = 2.8312$ | $d_9 = 0.8225$ | $n_{d5} = 1.69680$ $\nu_{d5} = 55.52$ |
| $r_{10} = -1.0375$ | $d_{10} = 0.2071$ | $n_{d6} = 1.84666$ $\nu_{d6} = 23.78$ |
| $r_{11} = -2.6812$ | $d_{11} = 0.0866$ | |
| $r_{12} = \infty$ | $d_{12} = 0.3463$ | $n_{d7} = 1.52287$ $\nu_{d7} = 59.89$ |
| $r_{13} = \infty$ | $d_{13} = 0.3154$ | |
| $r_{14} = \infty$ | $d_{14} = 0.8658$ | $n_{d8} = 1.51633$ $\nu_{d8} = 64.15$ |
| $r_{15} = \infty$ | | |

$-|f_1| + |f_2| = 0.541$
$|f_1|/|f_2| = 0.548$
$f_{12} = 2.322$
$f_3 = 2.546$
$f_3/H = 2.866$

Example 10

$f = 1$
$F_{NO} = 2.494$
$IH = 0.8103$
$2\omega = 114°$

| | | |
|---|---|---|
| $r_1 = \infty$ | $d_1 = 0.3002$ | $n_{d1} = 1.88300$ $\nu_{d1} = 40.78$ |
| $r_2 = 0.9103$(aspheric) | $d_2 = 0.5205$ | |
| $r_3 = 3.9628$ | $d_3 = 1.2467$ | $n_{d2} = 1.72916$ $\nu_{d2} = 54.68$ |
| $r_4 = -1.2961$ | $d_4 = 0.0790$ | |
| $r_5 = \infty$(stop) | $d_5 = 0.3160$ | $n_{d3} = 1.52287$ $\nu_{d3} = 59.89$ |
| $r_6 = \infty$ | $d_6 = 0.0237$ | |
| $r_7 = \infty$ | $d_7 = 0.4897$ | $n_{d4} = 1.52000$ $\nu_{d4} = 74.00$ |
| $r_8 = \infty$ | $d_8 = 0.0790$ | |
| $r_9 = 1.7906$ | $d_9 = 0.8284$ | $n_{d5} = 1.69680$ $\nu_{d5} = 55.52$ |
| $r_{10} = -1.0424$ | $d_{10} = 0.2079$ | $n_{d6} = 1.84666$ $\nu_{d6} = 23.78$ |
| $r_{11} = -12.3458$ | $d_{11} = 0.0790$ | |
| $r_{12} = \infty$ | $d_{12} = 0.3160$ | $n_{d7} = 1.52287$ $\nu_{d7} = 59.89$ |
| $r_{13} = \infty$ | $d_{13} = 0.3474$ | |
| $r_{14} = \infty$ | $d_{14} = 0.7899$ | $n_{d8} = 1.51633$ $\nu_{d8} = 64.15$ |
| $r_{15} = \infty$ | | |

Aspherical Coefficients

Second serface
$P = 1$
$A_4 = 0.29486 \times 10^0$
$A_6 = 0.13571 \times 10^0$
$A_8 = 0.23763 \times 10^{-1}$
$-|f_1| + |f_2| = 0.457$
$|f_1|/|f_2| = 0.693$
$f_{12} = 2.301$
$f_3 = 3.066$
$f_3/H = 3.784$ Example 11

$f = 1$
$F_{NO} = 2.484$
$IH = 0.8921$
$2\omega = 114°$

| | | |
|---|---|---|
| $r_1 = \infty$ | $d_1 = 0.3304$ | $n_{d1} = 1.88300$ $\nu_{d1} = 40.78$ |
| $r_2 = 0.7473$ | $d_2 = 0.5498$ | |
| $r_3 = 2.2952$ | $d_3 = 1.5786$ | $n_{d2} = 1.72916$ $\nu_{d2} = 54.68$ |
| $r_4 = -1.3331$(aspheric) | $d_4 = 0.0870$ | |
| $r_5 = \infty$(stop) | $d_5 = 0.3478$ | $n_{d3} = 1.52287$ $\nu_{d3} = 59.89$ |
| $r_6 = \infty$ | $d_6 = 0.0261$ | |
| $r_7 = \infty$ | $d_7 = 0.5391$ | $n_{d4} = 1.52000$ $\nu_{d4} = 74.00$ |
| $r_8 = \infty$ | $d_8 = 0.0870$ | |
| $r_9 = 3.0364$ | $d_9 = 0.9124$ | $n_{d5} = 1.69680$ $\nu_{d5} = 55.52$ |
| $r_{10} = -1.1510$ | $d_{10} = 0.2289$ | $n_{d6} = 1.84666$ $\nu_{d6} = 23.78$ |
| $r_{11} = -5.5342$ | $d_{11} = 0.0870$ | |
| $r_{12} = \infty$ | $d_{12} = 0.3478$ | $n_{d7} = 1.52287$ $\nu_{d7} = 59.89$ |
| $r_{13} = \infty$ | $d_{13} = 0.3688$ | |
| $r_{14} = \infty$ | $d_{14} = 0.8696$ | $n_{d8} = 1.51633$ $\nu_{d8} = 64.15$ |
| $r_{15} = \infty$ | | |

Aspherical Coefficients

4th serface
$P = 1$
$A_4 = 0.45103 \times 10^{-1}$
$A_6 = 0.26902 \times 10^{-1}$
$A_8 = 0.47544 \times 10^{-1}$
$-|f_1| + |f_2| = 0.57$
$|f_1|/|f_2| = 0.597$
$f_{12} = 1.745$ -continued $f_3 = 4.044$
$f_3/H = 4.533$

Example 12

$f = 1$
$F_{NO} = 2.511$
$IH = 0.9111$
$2\omega = 114°$

| | | |
|---|---|---|
| $r_1 = \infty$ | $d_1 = 0.3375$ | $n_{d1} = 1.88300$ $\nu_{d1} = 40.78$ |
| $r_2 = 0.9209$ | $d_2 = 0.7167$ | |
| $r_3 = 2.2429$ | $d_3 = 1.4831$ | $n_{d2} = 1.72000$ $\nu_{d2} = 50.25$ |
| $r_4 = -1.9662$ | $d_4 = 0.088$ | |
| $r_5 = \infty$(stop) | $d_5 = 0.3552$ | $n_{d3} = 1.52287$ $\nu_{d3} = 59.89$ |
| $r_6 = \infty$ | $d_6 = 0.0266$ | |
| $r_7 = \infty$ | $d_7 = 0.5506$ | $n_{d4} = 1.52000$ $\nu_{d4} = 74.00$ |
| $r_8 = \infty$ | $d_8 = 0.0877$ | |
| $r_9 = 2.3798$ | $d_9 = 0.8765$ | $n_{d5} = 1.69680$ $\nu_{d5} = 55.52$ |
| $r_{10} = -1.0330$ | $d_{10} = 0.1940$ | $n_{d6} = 1.84666$ $\nu_{d6} = 23.78$ |
| $r_{11} = -3.1602$(aspheric) | $d_{11} = 0.0888$ | |
| $r_{12} = \infty$ | $d_{12} = 0.3552$ | $n_{d7} = 1.52287$ $\nu_{d7} = 59.89$ |
| $r_{13} = \infty$ | $d_{13} = 0.4498$ | |
| $r_{14} = \infty$ | $d_{14} = 0.8881$ | $n_{d8} = 1.51633$ $\nu_{d8} = 64.15$ |
| $r_{15} = \infty$ | | |

Figure 7:
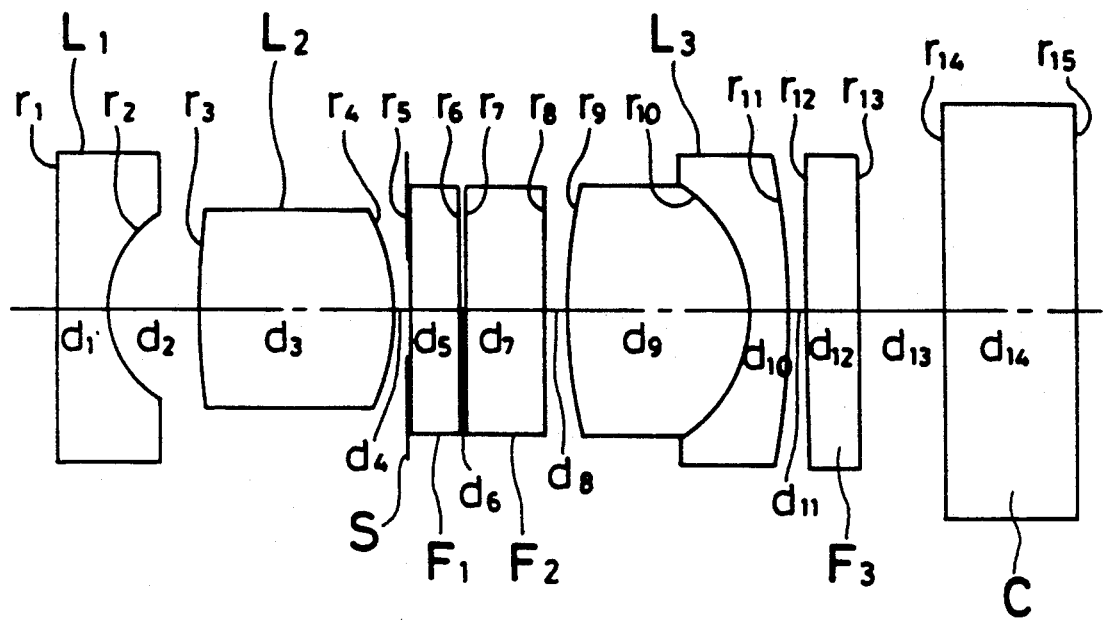
FIGS. 7 and 8 represent in section the objective lenses for endoscopes according to Examples 1 and 2 of this invention.
Figure 8:
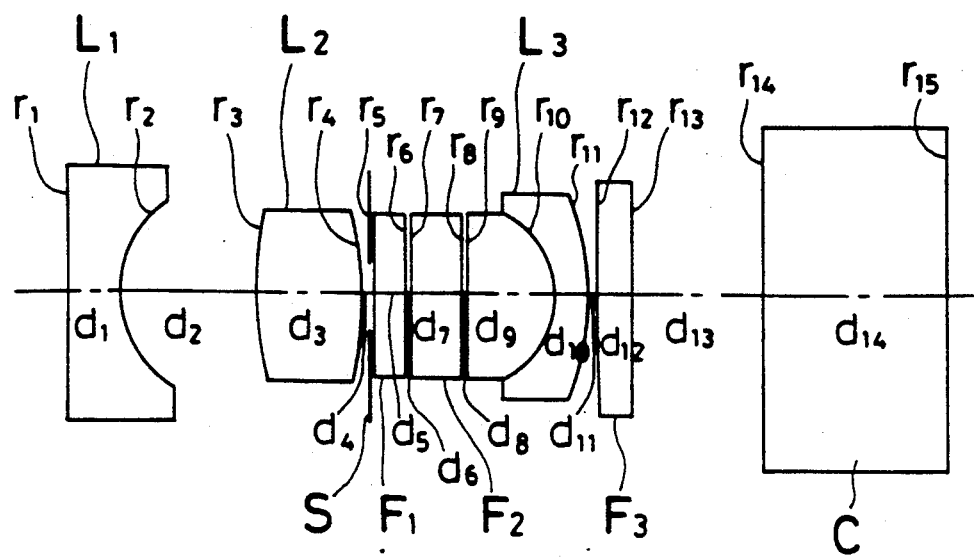
Figure 9:
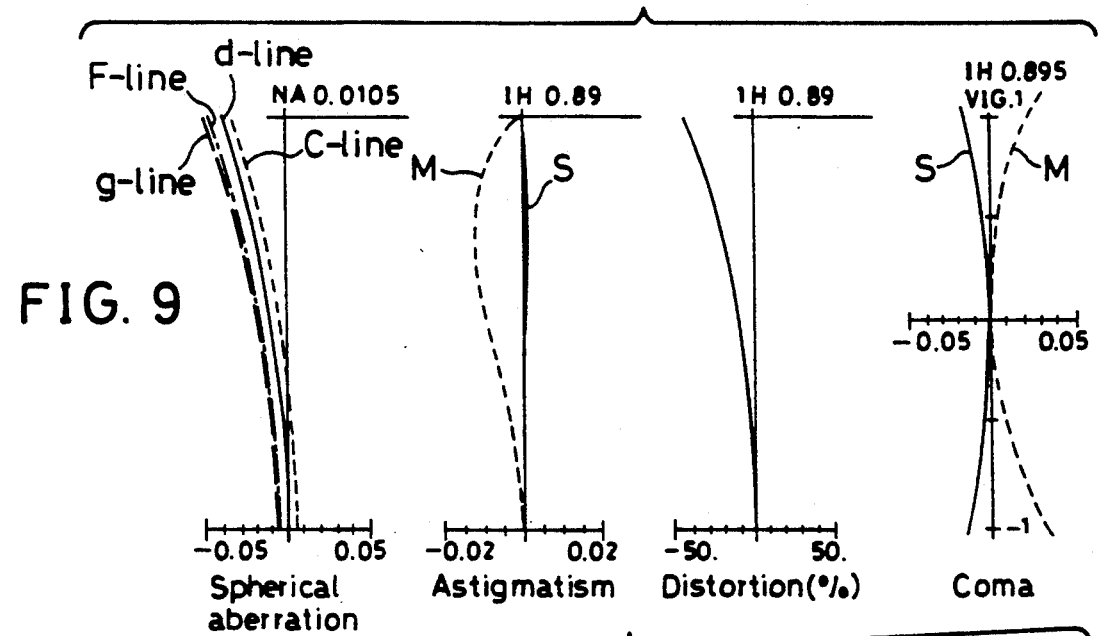
FIGS. 9-20 are aberration diagrams according to Examples 1-12 of this invention.
Figure 10:
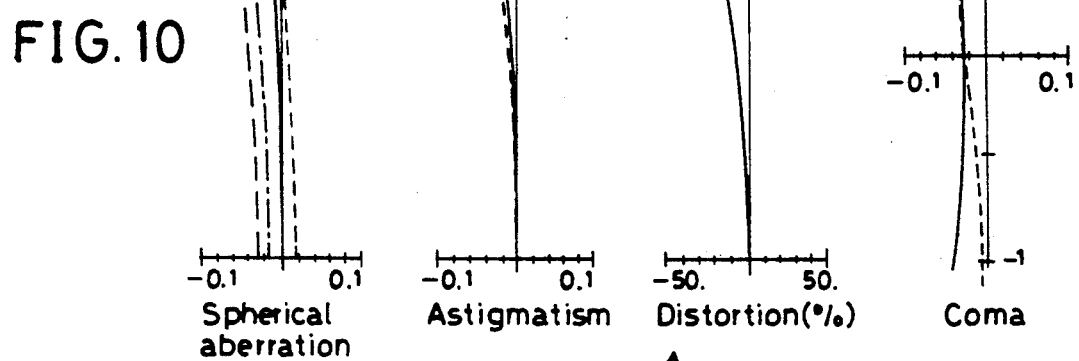
Figure 11:
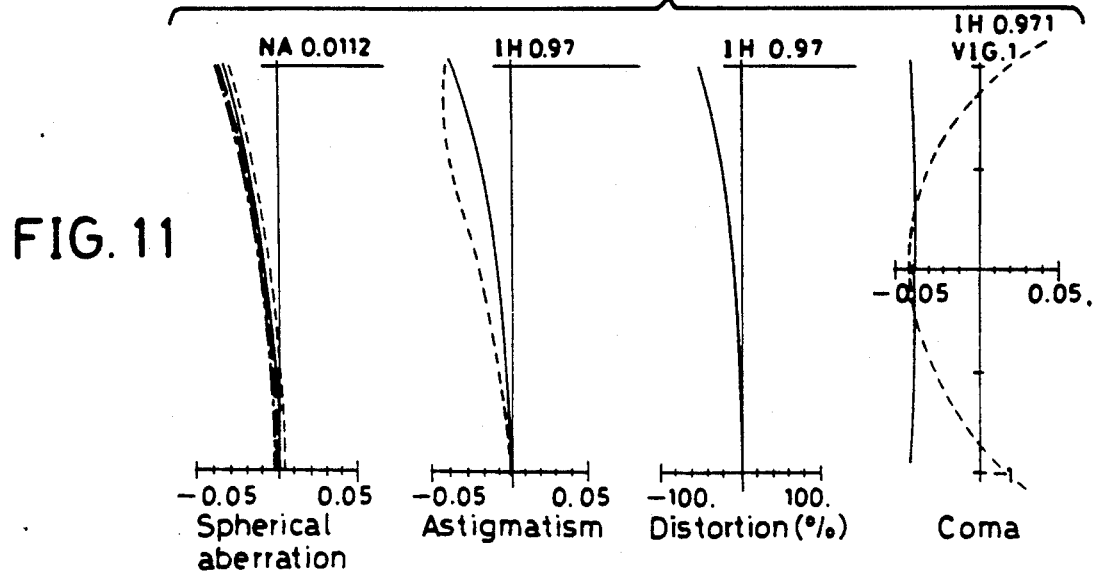
Figure 12:
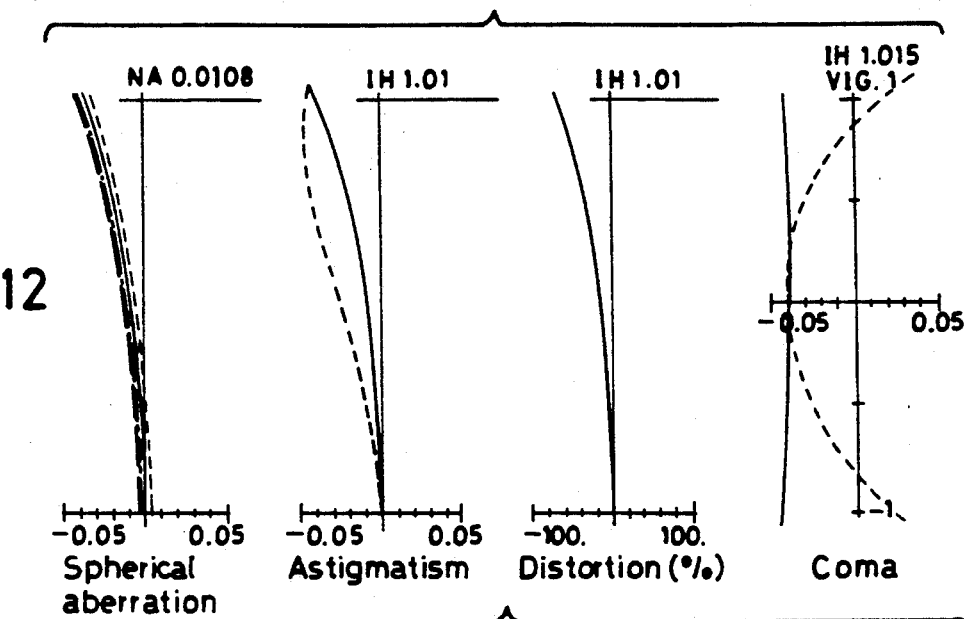
Figure 13:
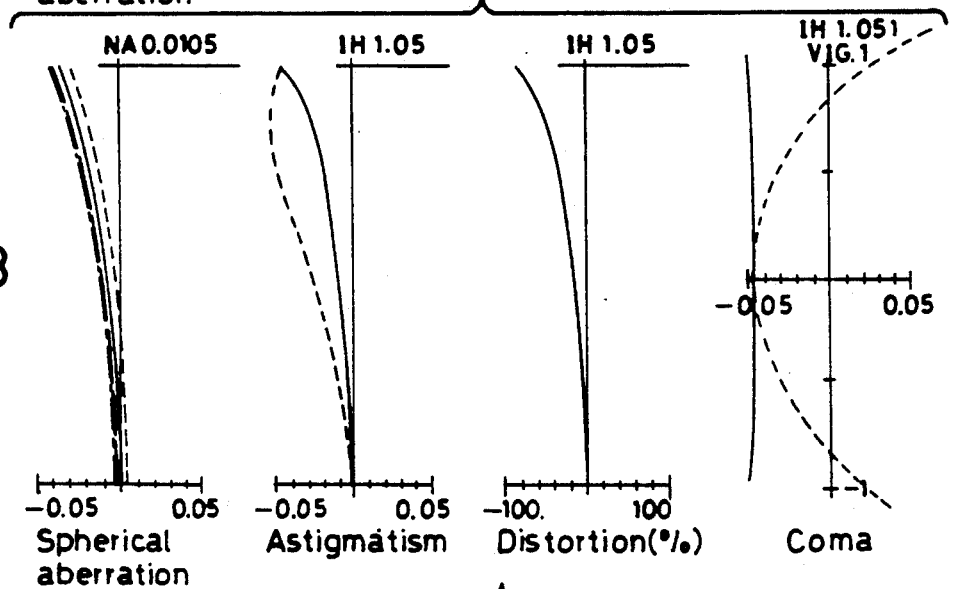
Figure 14:
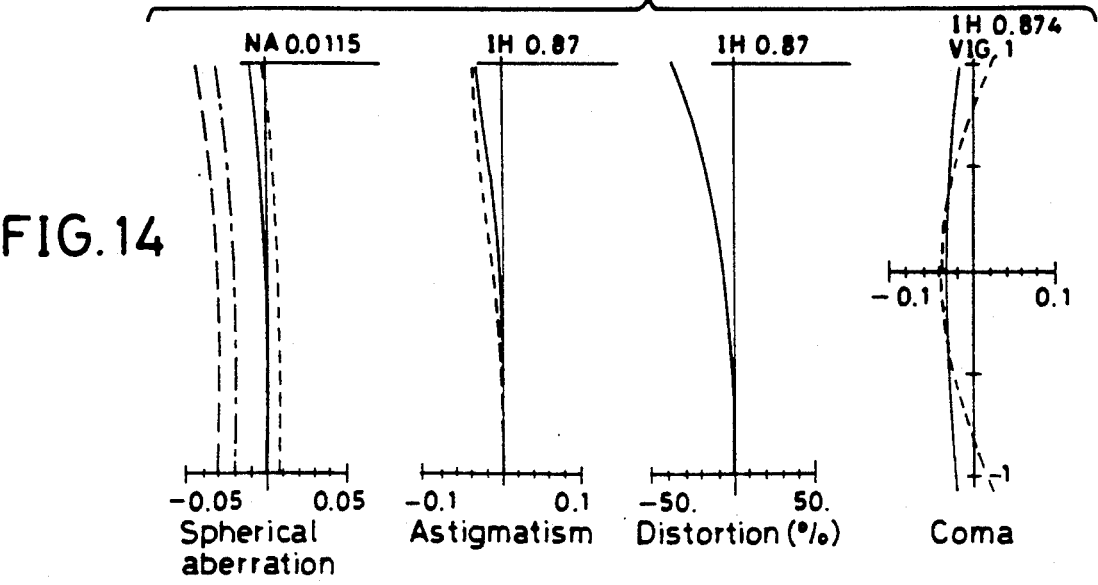
Figure 15:
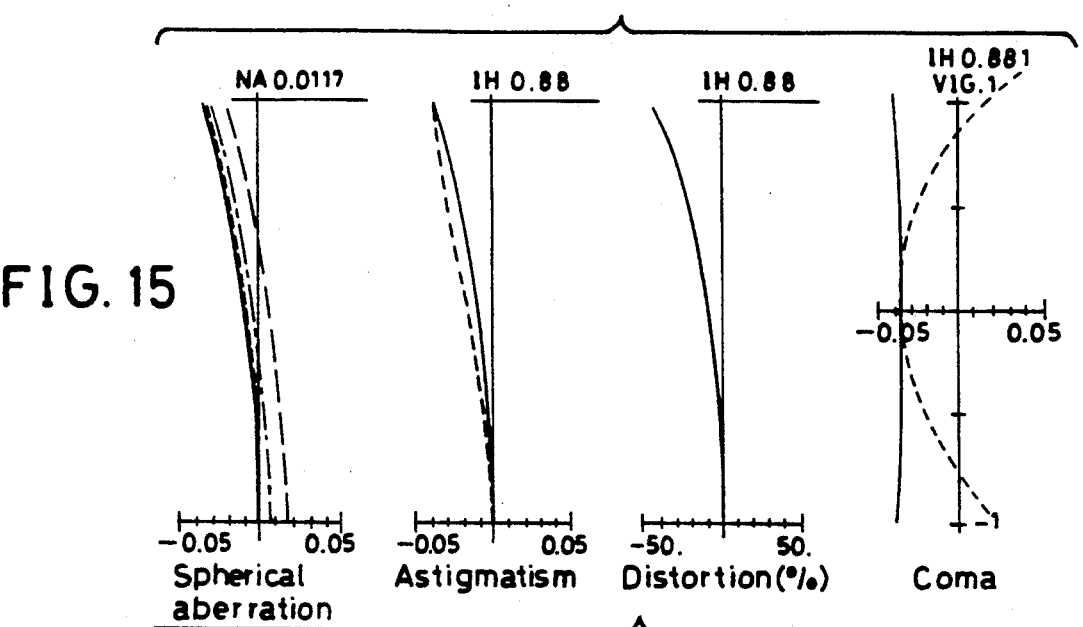
Figure 16:
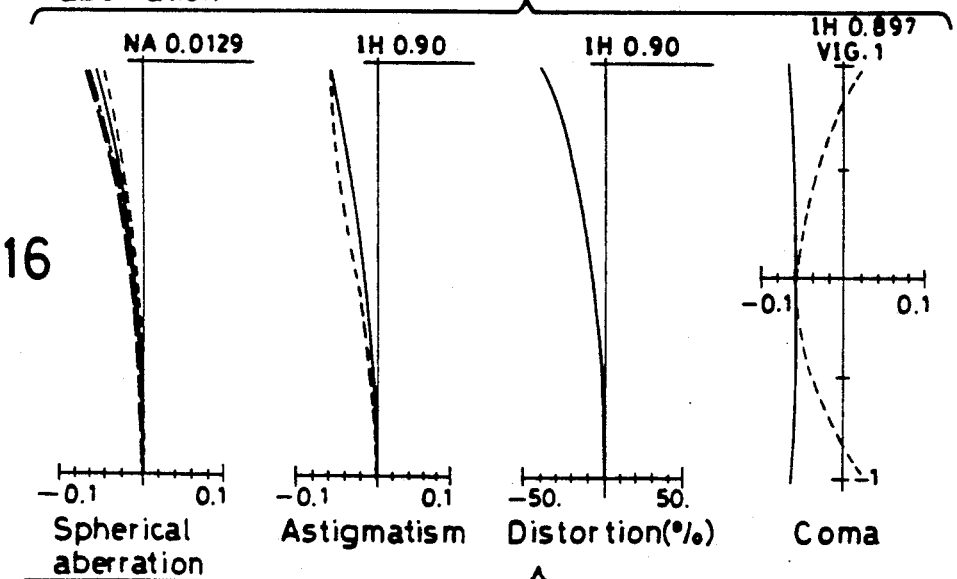
Figure 17:
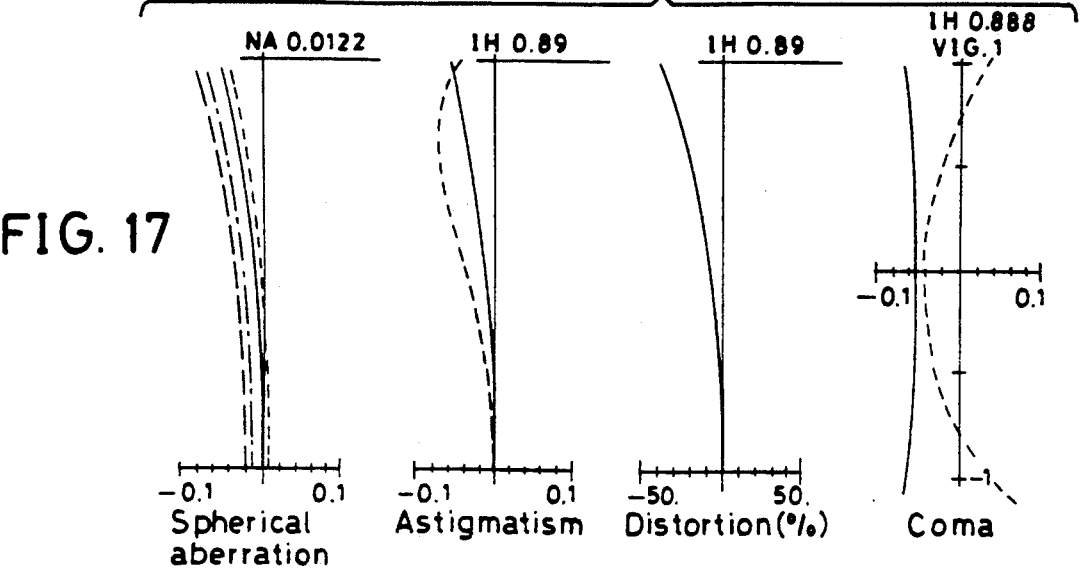
Figure 18:
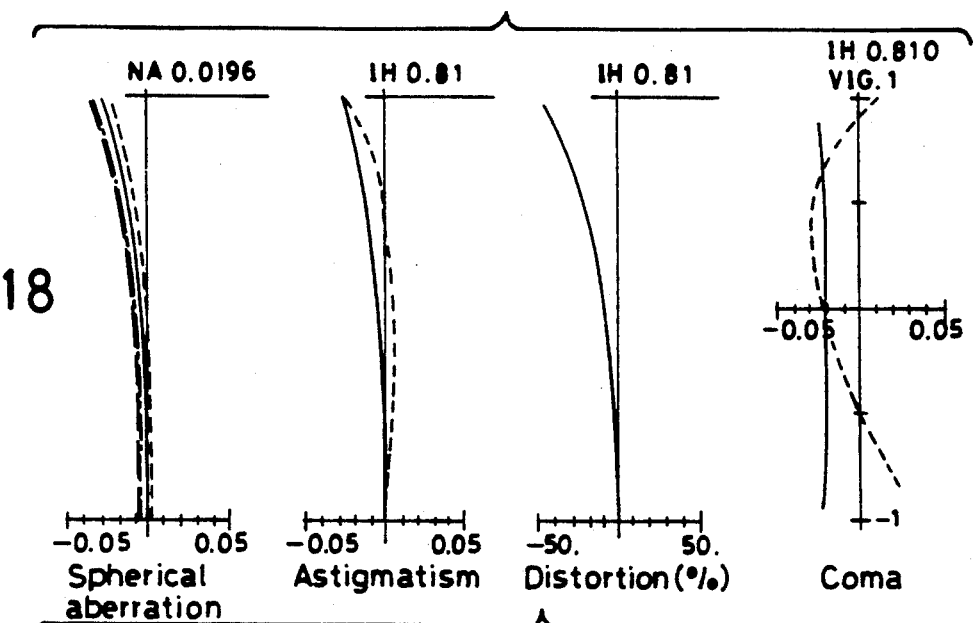
Figure 19:
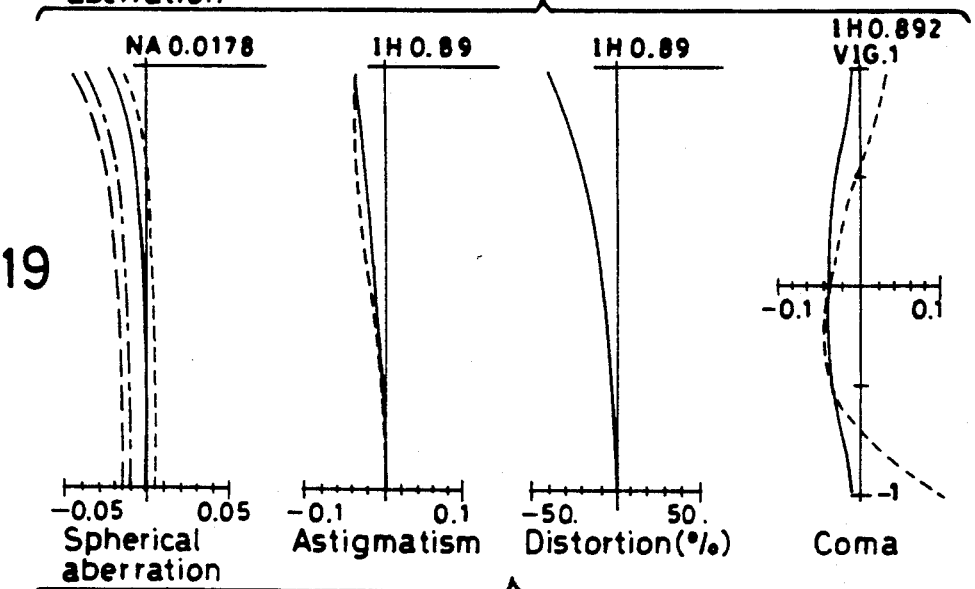
Figure 20:
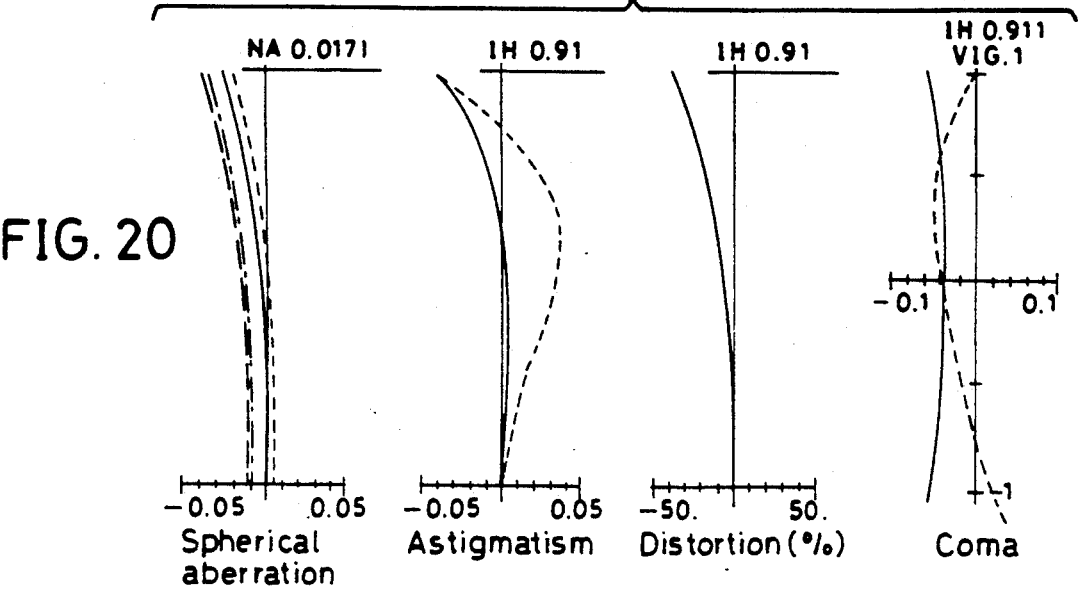

Aspherical Coefficients
  11th serface
  $P = 1$
  $A_4 = 0.75385 \times 10^{-1}$
  $A_6 = 0.10527 \times 10^0$
  $A_8 = 0.62616 \times 10^{-1}$
  $-|f_1| + |f_2| = 0.664$
  $|f_1|/|f_2| = 0.611$
  $f_{12} = 3.009$
  $f_3 = 2.549$
  $f_3/H = 2.798$ Examples 1 and 2 are directed to objective lens systems shown in section in FIGS. 7 and 8 and being designed to be used in combination with solid-state image sensors. The field angles of Examples 1 and 2 are 114.6° and 112.5°, respectively. In FIGS. 7 and 8, $F_1$ and $F_3$ stand for YAG cutoff filters for cutting off laser light unnecessary for viewing, $F_2$ denotes an infrared cutoff filter for absorbing unnecessary infrared light, and C indicates glass coverings for the solid-state image sensors.

Examples 3, 4 and 5 are directed to objective lens systems each having a sectional shape similar to that shown in FIG. 7 and being designed to be used in combination with a solid-state image sensor, as is the case with Examples 1 and 2. The field angles of Examples 3, 4 and 5 are 133°, 147° and 166°.

Examples 6 and 7 are directed to objective image systems each having a sectional shape similar to that shown in FIG. 7 being designed to be used in combination with a solid-state image sensor, as is the case with Example 1, having an identical field angle of 114° and including a second lens component formed of a different glass material.

Example 8 is directed to an objective lens system which is of a sectional shape similar to that shown in FIG. 7, is designed to be used in combination with a solid-state image sensor, as is the case with Example 1, has a field angle of 114° and has a short total length.

Example 9 is directed to a telecentric objective lens system which is of a sectional shape similar to that shown in FIG. 7, is adapted to be used in combination with a solid-state image sensor, as is the case with Example 1, and has a field angle of 114°.

Example 10 is directed to an objective lens system which is of a sectional shape similar to that shown in FIG. 7 and has a field angle of 114° and in which an aspherical surface that becomes increased in the negative refractive action as it goes off the center of the lens is applied to the image plane-side concave surface of the negative lens of the first lens component located in front of the aperture stop. By using such an aspherical surface, a large (−) coma is generated with respect to a large (+) coma occurring on the image plane-side convex surface of the positive lens of the second lens component when a high numerical aperture is achieved, whereby the coma can be well corrected in front of the aperture stop. Simultaneously with this, a large astigmatism occurring on the image plane-side convex surface of the positive lens of the second lens component can also be well corrected without making the spherical aberration worse, because the height of the axial marginal ray is lower than that of the off-axial principal ray on the image plane-side concave surface of the negative lens of the first lens component.

Example 11 is directed to an objective lens system which is of a sectional shape similar to that shown in FIG. 7 and has a field angle of 114° and in which an aspherical surface that becomes increased in the negative refraction action or decreased in the positive refractive action as it goes off the center of the lens is applied to the image-side convex surface of the positive lens of the second lens component located in front of the aperture stop. By making use of such an aspherical surface, a large (+) coma occurring on this surface is reduced when a high numerical aperture is achieved, so that it can be balanced with a large (−) coma occurring on the image plane-side concave surface of the negative lens of the first lens component, thereby correcting the coma well by the front unit before the stop. At the same time, a large spherical aberration occurring on the image-side convex surface of the positive lens of the second lens component is also corrected to keep the aberrations in good condition.

Example 12 is directed to an objective lens system which is of a sectional shape similar to that shown in FIG. 7 and has a field angle of 114° and in which an aspherical surface that becomes decreased in the positive refractive action as it goes off the center of the lens is applied to the image-side convex surface of the cemented lens of the third lens component. By using the aspherical surface on this lens surface, a large (−) coma occurring on the image-side concave surface of the negative lens of the first lens component can be corrected when a high numerical aperture is achieved, while other aberrations are kept in good condition.

By being constructed as has been explained above, the objective lens system for endoscopes according to this invention provides a retrofocus type of objective optical system which has a wider field angle, is made more compact because of being more reduced in terms of the total length and outer diameter, consists of a more limited number of lenses and is more satisfactory corrected in terms of various aberrations.

What is claimed is:

1. An objective lens system for endoscopes comprising, in order from an object side to an image side of the system:
    a first lens component having a negative refractive power,
    a second lens component comprising an uncemented lens having a positive refractive power,
    an aperture stop, and
    a third lens component comprising a positive and a negative lens cemented together,
    wherein the cemented positive and negative lenses which comprise the third lens component are the only lenses located on the image side of said aperture stop.

2. An objective lens system for endoscopes as claimed in claim 1, wherein the composite focal length of the first and second lens components located in front of said aperture stop is positive.

3. An objective lens system for endoscopes as claimed in claim 1, or claim 2, satisfying the following conditions (1) and (2):

$$0.1f < -|f_1| + |f_2| < 3f, \quad (1)$$

and $$0.1 < |f_1|/|f_2| < 1.5, \quad (2)$$

where f is the focal length of the total system and $f_1$ and $f_2$ represent the focal lengths of the first and second lens components, respectively.

4. An objective lens system for endoscopes as claimed in claim 1 or claim 2, satisfying the following condition (3):

$$f < f_3 < 6f, \quad (3)$$

where $f_3$ is the focal length of the third lens component.

5. An objective lens system for endoscopes as claimed in claim 4, satisfying the following condition (4):

$$f_3/H > 1.2, \quad (4)$$

where H is the maximum image height.

6. An objective lens system for endoscopes, as claimed in claim 1 or claim 2, wherein at least one aspherical surface is used.

7. An objective lens system for endoscopes as claimed in claim 1 or claim 2, wherein at least one aspherical surface that becomes increased in the refractive action in the negative direction as it goes off the center of the lens is applied to the surface of a lens positioned in front of said aperture stop.

8. An objective lens system as claimed in claim 7, wherein at least one of the first and second lens components has an aspherical surface proximate to the image side.

9. An objective lens system for endoscopes comprising, in order along an optical axis and from an object side to an image side of the system:
    a first lens component having a negative refractive power,
    a second lens component comprising an uncemented lens having a positive refractive power,
    an aperture stop, and
    a third lens component comprising a positive and a negative lens cemented together,
    wherein an image-side convex surface of the third lens component has an aspherical surface that decreases in positive refractive action as it is spaced away from the optical axis.

10. An objective lens system for endoscopes comprising, in order from an object side to an image side of the system:
    a first lens component having a negative refractive power,
    a second lens component comprising an uncemented lens having a positive refractive power,
    an aperture stop, and
    a third lens component comprising a positive and a negative lens cemented together,
    wherein the cemented positive and negative lenses which comprise the third lens component are the only lens elements disposed on the image side of said aperture stop, and
    the composite focal length of the first and second lens components is positive.

11. An objective lens system for endoscopes comprising, in order from an object side to an image side of the system:
    a first lens component having a negative refractive power,
    a second lens component comprising an uncemented lens having a positive refractive power,
    an aperture stop, and
    a third lens component comprising a positive and a negative lens cemented together,
    wherein the cemented positive and negative lenses which comprise the third lens component are the only lenses disposed on the image side of said aperture stop, and the objective lens system satisfies a condition $$0.1f < -|f_1| + |f_2| < 3f,$$

and $$0.1 < |f_1|/|f_2| < 1.5$$

where f is the focal length of the total system and $f_1$ and $f_2$ are the focal lengths of the first and second lens components, respectively.